(12) United States Patent
Corriol

(10) Patent No.: US 9,512,285 B2
(45) Date of Patent: Dec. 6, 2016

(54) METHOD FOR HEAT-TREATING POWDERS

(71) Applicant: RHODIA OPERATIONS, Paris (FR)

(72) Inventor: Cecile Corriol, Lyons (FR)

(73) Assignee: Rhodia Operations, Aubervilliers (FR)

( * ) Notice: Subject to any disclaimer, the term of this patent is extended or adjusted under 35 U.S.C. 154(b) by 0 days.

(21) Appl. No.: 14/407,471

(22) PCT Filed: Jun. 6, 2013

(86) PCT No.: PCT/EP2013/061718
§ 371 (c)(1),
(2) Date: Dec. 12, 2014

(87) PCT Pub. No.: WO2013/186120
PCT Pub. Date: Dec. 19, 2013

(65) Prior Publication Data
US 2015/0152233 A1 Jun. 4, 2015

(30) Foreign Application Priority Data

Jun. 12, 2012 (FR) ..................................... 12 55474

(51) Int. Cl.
| | | |
|---|---|---|
| *C08F 6/00* | (2006.01) | |
| *B29C 71/02* | (2006.01) | |
| *B29C 67/00* | (2006.01) | |
| *B32B 27/08* | (2006.01) | |
| *B32B 27/34* | (2006.01) | |
| *B29K 77/00* | (2006.01) | |
| *B33Y 10/00* | (2015.01) | |
| *B33Y 70/00* | (2015.01) | |
| *B33Y 80/00* | (2015.01) | |
| *B29L 9/00* | (2006.01) | |

(52) U.S. Cl.
CPC .............. *C08J 7/08* (2013.01); *B29C 67/0074* (2013.01); *B29C 67/0077* (2013.01); *B32B 27/08* (2013.01); *B32B 27/34* (2013.01); *B29K 2077/00* (2013.01); *B29L 2009/00* (2013.01); *B32B 2270/00* (2013.01); *B33Y 10/00* (2014.12); *B33Y 70/00* (2014.12); *B33Y 80/00* (2014.12); *C08J 2377/06* (2013.01); *C08J 2477/06* (2013.01); *Y10T 428/31728* (2015.04)

(58) Field of Classification Search
CPC ..................................... C08F 6/00; C08G 3/00
USPC ......................................................... 528/503
See application file for complete search history.

(56) References Cited

U.S. PATENT DOCUMENTS

| | | |
|---|---|---|
| 5,959,069 A | 9/1999 | Gluck et al. |
| 6,136,948 A | 10/2000 | Dickens, Jr. et al. |
| 6,160,080 A | 12/2000 | Cuchinella et al. |
| 6,525,166 B1 | 2/2003 | Di Silvestro et al. |
| 2004/0138363 A1 | 7/2004 | Baumann et al. |
| 2006/0071359 A1 | 4/2006 | Monsheimer et al. |
| 2009/0072424 A1 | 3/2009 | Herve et al. |
| 2010/0009189 A1 | 1/2010 | Herve |
| 2011/0237731 A1* | 9/2011 | Paternoster ......... B29C 67/0077 524/441 |
| 2011/0293918 A1 | 12/2011 | Lucas et al. |
| 2013/0307196 A1 | 11/2013 | Corriol et al. |

FOREIGN PATENT DOCUMENTS

| | | |
|---|---|---|
| CA | 2460664 A1 | 9/2004 |
| EP | 0672703 A1 | 9/1995 |
| EP | 0682057 A1 | 11/1995 |
| EP | 1459871 A2 | 9/2004 |
| FR | 2743077 A1 | 7/1997 |
| FR | 2779730 A1 | 12/1999 |
| FR | 2968664 A1 | 6/2012 |
| WO | WO 9606881 A2 | 3/1996 |
| WO | WO 9635739 A1 | 11/1996 |
| WO | WO 9851464 A1 | 11/1998 |
| WO | WO 0138061 A1 | 5/2001 |
| WO | WO 2006040443 A1 | 4/2006 |
| WO | WO 2007115977 A1 | 10/2007 |
| WO | WO 2010063691 A2 | 6/2010 |
| WO | WO 2012047613 A1 | 4/2012 |
| WO | WO 2012076528 A1 | 6/2012 |

* cited by examiner

*Primary Examiner* — Terressa Boykin
(74) *Attorney, Agent, or Firm* — Osha Liang LLP

(57) ABSTRACT

The present invention relates to a process comprising a step of heat treatment of a polyamide-based powder so as to reduce the difference between the initial crystal rearrangement temperature and the final crystal rearrangement temperature. The invention also relates to articles obtained by using powders that have undergone this treatment, in particular by selective melting of layers of polymer powder, in particular rapid prototyping by solid-phase sintering using a laser.

22 Claims, No Drawings

METHOD FOR HEAT-TREATING POWDERS

This application is a U.S. national stage entry under 35 U.S.C. §371 of International Application No PCT/EP2013/061718, filed Jun. 6, 2013, which claims priority to French Application Number 1255474 filed on Jun. 12, 2012. The entire content of each of these applications is hereby incorporated herein.

The present invention relates to a process comprising a step of heat treatment of a polyamide-based powder so as to reduce the difference between the initial crystal rearrangement temperature and the final crystal rearrangement temperature. The invention also relates to articles obtained by using powders that have undergone this treatment, in particular by selective melting of layers of polymer powder, in particular rapid prototyping by solid-phase sintering using a laser.

The process for manufacturing articles by selective melting of layers of polymer powder is a process that makes it possible to obtain pieces of complex shapes without tooling and without machining, from a three-dimensional image of the article to be made, by sintering superposed layers of polymer powders, especially using a laser. Thermoplastic polymers are generally used to do this. General details regarding rapid prototyping by laser sintering are mentioned in U.S. Pat. No. 6,136,948 and patent applications WO 96/06881 and US 2004/0 138 363. The technology of agglomerating polyamide powders under electromagnetic radiation is used to manufacture three-dimensional objects for diverse applications, especially prototypes and models.

Document WO 2012/047 613 for its part describes a process for heat-treating polyaryl ether ketone or polyether ketone ketone powders. This process is performed on very specific polymers that have several crystal forms, and above all several melting points. The difference between the highest melting point and the lowest melting point is great and makes it possible especially to distinguish these two melting points.

However, despite the recent advances, especially in the case of laser sintering, it nevertheless remains desirable to obtain powders that have:
  improved intrinsic characteristics, such as more precise dimensioning, improved flowability, and/or
  "extrinsic" properties, i.e. properties that make it possible to obtain articles with improved properties, for example either in terms of mechanical strength, chemical resistance and/or aging, or in terms of appearance, or that allow the establishment of a manufacturing process that is easier and/or less intensive in terms of time, energy or material and/or less expensive.

It is particularly desirable to find powders that make it possible to obtain articles that also have improved properties, especially in mechanical terms, in terms of resistance over time (aging), heat resistance, light resistance and/or chemical resistance, most particularly making it possible to use high temperatures, and having improved properties for laser sintering.

The Applicant has discovered that the reduction in the difference between the final crystal rearrangement temperature and the initial crystal rearrangement temperature, also known as the Tfr–Tir, is a parameter that has an influence on the properties of polyamide powders, in particular with regard to their use for making articles by selective melting of layers of (co)polyamide powder, especially of type 6 or 66. A decrease in this difference may make it possible to improve the characteristics of the powder, especially to decrease or even to avoid the presence of cracks and/or lumps at the surface of the bed of powders during the manufacture of articles, to improve its aptitude for sintering, and/or the flowability of the powder, and also to improve the article obtained by laser sintering, especially in terms of surface quality.

The Applicant has just developed a process for decreasing the difference between the final crystal rearrangement temperature and the initial crystal rearrangement temperature, symbolized by the expression "Tfr–Tir", of a (co)polyamide powder. Said process may make it possible to improve the properties of said powder, especially when it is used for making articles by selective melting of powder layers.

The phenomenon of crystal rearrangement, also known as "cold crystallization", for example in French patent application FR 10 60345, published under the number FR 2 968 664, corresponds to an exothermic process derived from the rearrangement of the amorphous regions of the material into crystalline regions. It appears at a temperature below the melting point of the polymer. It may be demonstrated by DSC (differential scanning calorimetry) measurements under standard or modulated conditions. It corresponds to an exothermic peak appearing before the endothermic melting peak. Under standard conditions of DSC measurement, the exotherm of the crystal rearrangement may be masked entirely or partially by the other phenomena, especially such as melting. Modulated DSC, in contrast, allows separation of the reversible phenomena from the irreversible phenomena by application of a signal which is sinusoidal in temperature. Modulated DSC effectively makes it possible to separate the total heat flow into its thermodynamic and kinetic components. The phenomenon of crystal rearrangement then appears as an irreversible phenomenon (kinetic component of the total signal) and is then separate from melting.

Thus, according to a first aspect, a subject of the invention is a process for the heat treatment of a (co)polyamide composition, especially in powder form, comprising at least the following steps:
  heating to bring the composition to a temperature below the lowest melting point, or Tfmin, and above the temperature Tfmin−30° C., for at least 10 minutes,
  cooling to room temperature, i.e. 25° C.,
  recovering the composition, obtained especially in powder form, said recovered composition having a value Tfr–Tir that is decreased relative to the initial value Tfr–Tir, i.e. before treatment, in particular said (co)polyamide is semicrystalline.

The temperatures Tir and Tfr are measured via a modulated DSC process P which consists in measuring the values Tir and Tfr by modulated differential calorimetric analysis in which:
a) the composition, and in particular the (co)polyamide(s), is maintained at a temperature of 25° C. for 5 minutes,
b) a temperature-modulated increase is performed at a rate of 3° C./min up to 250° C. with a sinusoidal amplitude of 0.48° C. and a period of 1 minute, followed by cooling, at a rate of 3° C./min down to 25° C. and the signal is recorded.

More particularly, the process P is as described below, and comprises four steps:
1. Startup of the machine
  Machine used: Q2000, TA Instruments.
  Power up the instrument and leave to equilibrate for at least 30 minutes.
  Calibrate the machine according to the machine manufacturer's recommendations.

The nitrogen used is of analytical grade. It will be used for all the measurements, in accordance with the machine manufacturer's recommendations.

2. Placing of the sample in the crucible and manipulation of the crucibles.

Weigh two crucibles with their lid: a first crucible in which will be placed the sample and a second crucible which will serve as a reference.

Place between 2 and 5 g of material in the first crucible. The weighing accuracy must be ±0.1 mg.

Close the two crucibles with their lid using a crimper.

Check that the outside of the two crucibles is clean.

Place the crucibles in the calorimeter cells using tongs.

Close the lid of the sample holder and the lid of the cell containing the reference.

3. Modulated differential calorimetric analyses or modulated DSC.

Configure the temperature increase and decrease modulation:
  Sinusoidal amplitude: 0.48° C.
  Period: 1 min Perform a first isotherm of 5 minutes at 25° C. to stabilize the modulation.

Perform a temperature ramp to 250° C., at a rate of 3° C./min.

Perform a cooling cycle to 25° C., at a rate of 3° C./min and record the results.

Open the sample holder. Take out the crucible containing the sample and check that it has not undergone any deformation and/or deterioration. If so, reject the measurement and perform a second measurement.

4. Determination of Tir and Tfr

In the TA Universal Analysis 2000 data processing software:

Label the peak corresponding to the first temperature rise and to the irreversible phenomena ("non-reversing heat flow"). The exothermic peak which appears corresponds to the crystal rearrangement of the material.

Construct the baseline of the peak which joins the two points at which the peak "detaches" from the baseline.

Measure:
  The initial crystal rearrangement temperature (Tir)
  The final crystal rearrangement temperature (Tfr)

In addition, this process may make it possible to determine the heat of cold crystallization $\Delta Hcf$ in joules/gram, which is given directly by the data processing software from the area A, as described in the French patent application whose filing number is 10 60345.

During the heating, the composition may be brought to a temperature ranging from Tfmin−28° C. to Tfmin−2° C., especially ranging from Tfmin−25° C. to Tfmin−5° C., in particular from Tfmin−22° C. to Tfmin−10° C., or even may be about Tfmin−20° C.

In particular, the composition, especially in powder form, is not brought to a temperature above or equal to its softening point, and the composition especially reaches a maximum temperature equal to the softening point −2° C. This softening point may be measured by dynamic mechanical analysis (DMA).

The process involves heating to bring the composition to a temperature below the lowest melting point, or Tfmin, and above the temperature Tfmin−30° C., and in particular to a temperature as defined above, for at least 10 minutes. More particularly, the composition is brought to such a temperature for a time ranging from 10 minutes to 120 minutes, especially from 10 to 60 minutes, or even from 15 to 45 minutes. The expression "the composition is brought to a temperature below X and above Y" means that the whole composition reaches and remains at a temperature within the range, in particular to the core of the composition.

Advantageously, the cooling is relatively slow, and in particular is obtained by simple stoppage of the heating.

According to the present invention, the melting point corresponds to the temperature of the top of the endothermic peak determined by DSC. In particular, this melting point is measured according to process P in which steps 1 to 3 are as described above, and step 4' of determination of the melting point Tf is as follows:

In the TA Universal Analysis 2000 data processing software:

Display the peak corresponding to the first temperature rise and to the reversible phenomena ("reversing heat flow"). The endothermic peak which appears corresponds to the melting of the material.

The temperature corresponding to the top of the peak is the melting point of the material.

According to one variant, the (co)polyamide(s) of the composition have only one melting point.

In the case of (co)polyamide(s) with several melting points, the temperature difference between the highest melting point and the lowest melting point may be less than or equal to 15° C., in particular less than or equal to 10° C., or even less than or equal to 5° C.

The powder obtained via the process may have a Tfr−Tir decreased by at least 15%, especially by at least 25%, or even by at least 30% relative to the value Tfr−Tir of the composition before treatment.

Said composition may comprise a content of (co)polyamide ranging from 50% to 100% by weight, relative to the total weight of the composition. More particularly, this content may range from 60% to 100% by weight, especially from 75% to 100% by weight, or even from 90% to 100% by weight relative to the total weight of the composition. According to a particular embodiment, the composition comprises a (co)polyamide content ranging from 95% to 100% by weight relative to the total weight of the composition.

The composition may comprise one or more (co)polyamide(s). When the composition comprises several (co)polyamides, the content of one of them may be greater than 80% by weight and especially 90% by weight relative to the total weight of the composition.

According to a particular embodiment, the composition comprises two, three or four (co)polyamides.

In the case where at least two, and in particular two, (co)polyamides are present in the composition, it is possible for them not to be in the form of a mixture of diacid regulated polyamide and of diamine regulated polyamide and/or of diacid regulated copolyamide and of diamine regulated copolyamide, in particular as defined in document US 2006/0 071 359.

According to another particular embodiment, the composition comprises only one (co)polyamide.

The composition may also consist solely of (co)polyamide, and especially of 1, 2, 3 or 4 (co)polyamides: in particular, it consists of only one (co)polyamide.

The polyamides can be chosen from the group consisting of polyamides obtained by polycondensation of at least one linear aliphatic dicarboxylic acid with an aliphatic or cyclic diamine or between at least one aromatic dicarboxylic acid and an aliphatic or aromatic diamine, polyamides obtained by polycondensation of at least one amino acid or lactam with itself, or their blend and (co)polyamides. Semicrystalline polyamides are particularly preferred. Linear polyamides are also preferred.

The polyamide may be chosen from the group comprising polyamides obtained by polycondensation of at least one aliphatic dicarboxylic acid with an aliphatic or cyclic diamine, such as PA 6.6, PA 6.10, PA 6.12, PA 10.10, PA 12.12, PA 4.6 or MXD 6, or between at least one aromatic dicarboxylic acid and an aliphatic or aromatic diamine, such as polyterephthalamides, polyisophthalamides or polyaramids, or a blend thereof and (co)polyamides thereof, especially PA 6.6/6.T. The polyamide of the invention may also be chosen from polyamides obtained by polycondensation of at least one amino acid or lactam with itself, it being possible for the amino acid to be generated by hydrolytic opening of a lactam ring, for instance PA 6, PA 7, PA 9, PA 11, PA 12 or PA 13, or a blend thereof and (co)polyamides thereof. The polyamide of the invention may also be chosen from the group of polyamides obtained by polycondensation of diacid, diamine and amino acid, such as the copolyamides PA 6.6/6. Linear polyamides are especially preferred.

According to one variant, the composition comprises a total content of PA11 and of PA 12 of less than or equal to 10% by weight relative to the total weight of (co)polyamide present in the composition, and most particularly the composition is free of PA11 and/or of PA12.

The composition may comprise a content of copolyamide ranging from 50% to 100% by weight and especially from 60% to 95% by weight relative to the total weight of polyamide, or even relative to the total weight of thermoplastic polymer, or even relative to the total weight of the composition.

According to one variant, the composition comprises as polyamide, or even as thermoplastic polymer, only one or more copolyamides, in particular as described in the present description.

According to a particular embodiment, the composition comprises at least one copolyamide obtained by polymerization of at least one constituent monomer of the polyamide and at least one or more comonomers. Advantageously, said copolyamide(s) are semicrystalline.

Said constituent monomer may be a monomer as defined in the preceding paragraphs. Most particularly, it is caprolactam or the corresponding amino acid.

In particular, the copolyamide comprises a content of constituent monomer of at least 80 mol % relative to the number of moles of the total mixture of monomers and comonomers of the copolyamide.

The term "comonomer", also known as the "minor comonomer", is a compound that is different from the constituent monomer of the polyamide and is capable of covalently bonding to the constituent monomers of the polyamide, especially via amide, ester or imide bonds, to form a copolyamide.

The aromatic and/or cycloaliphatic comonomers preferentially bear at least one function chosen from the group consisting of:
an amine function Am, capable in particular of forming an amide bond with a carboxylic acid function of the constituent monomer of the polyamide;
a carboxylic acid function Ac, capable in particular of forming an amide bond with an amine function of the constituent monomer of the polyamide;
an alcohol function OH, which is especially capable of forming an ester bond with a carboxylic acid function of the constituent monomer of the polyamide; and
a dicarboxylic acid function DA, which is especially capable of forming an imide bond with an amine function of the constituent monomer of the polyamide. This dicarboxylic acid function may comprise carboxylic acid functions that are germinal or on vicinal carbon atoms.

The amine function Am is preferentially a primary amine function or the salt thereof. The carboxylic acid function may be in salified or unsalified form.

Preferably, the comonomer is represented by formula (I) below:

$$R(Am)w\text{-}(Ac)x(OH)y(DA)z \qquad (I)$$

in which:
R is a linear, branched, aliphatic, aromatic or cycloaliphatic hydrocarbon-based radical optionally comprising from 1 to 20 carbon atoms and optionally comprising heteroatoms such as N, O or P;
w is between 0 and 4;
x is between 0 and 4;
y is between 0 and 4;
z is between 0 and 4; and
w+x+y+z is greater than or equal to 1, especially between 1 and 5.

The comonomers may be chosen from the group consisting of:
amino acids or amino carboxylic acids, for example comprising from 3 to 18 carbon atoms; lactams, for example comprising from 3 to 18 carbon atoms;
diamines, which may be aliphatic or aromatic or cycloaliphatic and which preferentially comprise from 3 to 18 carbon atoms;
diacids, which may be aliphatic, aromatic, or cycloaliphatic, and which preferably comprise from 3 to 18 carbon atoms;
monoacid or monoamine compounds generally used as polyamide chain limiters;
hydroxy acids or derivatives, comprising for example, preferably, from 3 to 18 carbon atoms;
lactones, for example comprising from 3 to 18 carbon atoms;
diols, which may be aliphatic or cycloaliphatic and which comprise preferably from 3 to 18 carbon atoms;
monomers comprising two carboxylic acid functions, allowing the formation of aliphatic, aromatic, or cycloaliphatic imide functions, and comprising from 3 to 18 carbon atoms;
or mixtures thereof.

Examples of aliphatic comonomers include those selected from the group consisting of the following: 11-aminoundecanoic acid, 12-aminododecanoic acid, lauryllactam, sebacic acid, dodecanedioic acid, tetramethylenediamine, trimethylhexamethylenediamine, adipic acid, hexamethylenediamine, oxalic acid, fumaric acid, maleic acid, methylglutaric acid, ethylsuccinic acid, meta-xylylenediamine, para-xylylenediamine, 1-methylpentamethylenediamine, fatty acids such as lauric acid, stearic acid, palmitic acid, benzylic acid, 1-naphthylacetic acid, 3-(3,5-di-tert-butyl-4-hydroxyphenyl)propionic acid, benzylamine, laurylamine, 1-naphthalenemethylamine, octanol, 2-ethylhexanol, ethylene glycol, 1,2-propanediol, 1,3-propanediol, 1,4-butanediol, ethanolamine, propanolamine, lactic acid, glycolic acid, caprolactone, butyrolactone, propionolactone, 3-hydroxybutyric acid, 3-hydroxyvaleric acid, 2,2,6,6-tetra((3-carboxyethyl)cyclohexanone, diaminopropane-N,N,N',N'-tetraacetic acid, malic acid, tartaric acid, citric acid, aspartic acid, glutamic acid, and dipentaerythritol.

For the purposes of the invention, the copolyamide thus comprises at least one comonomer, at least one of which is an aromatic or cycloaliphatic comonomer. The copolyamide may comprise a mixture of an aromatic comonomer and of a cycloaliphatic comonomer.

An aromatic comonomer is a comonomer comprising at least one aromatic ring and optionally one or more linear or branched hydrocarbon chains. The copolyamide according to the invention may comprise at least one minor aromatic comonomer, for instance those selected from the group consisting of the following: terephthalic acid, isophthalic acid, benzoic acid, phenylenediamine, 1-naphthoic acid, anthracene-9-carboxylic acid, aniline, naphthylamine, 1,8-naphthalenedicarboxylic acid, 2,6-naphthalenedicarboxylic acid, 5-hydroxyisophthalic acid, 5-sulfoisophthalic acid, 2,3-diaminonaphthalene, 1,5-diaminonaphthalene, 4-aminobenzoic acid, 4-hydroxybenzoic acid, 1-hydroxy-2-naphthoic acid, 3-hydroxy-2-naphthoic acid, 4,4'-diaminodiphenylmethane acid, 4-aminophenyl ether, trimesic acids, trimellitic acid, pyromellitic acid, 3,4,9,10-perylenetetracarboxylic acid, 5-aminoisophthalic acid, 3,5-diaminobenzoic acid, hydroquinone, resorcinol, bisphenol A, 4,4'-oxydiphenol, and tetrahydrophthalic anhydride.

The term "cycloaliphatic comonomer" means a comonomer comprising at least one aliphatic ring and optionally one or more linear or branched hydrocarbon chains. The copolyamide according to the invention may comprise at least one minor cycloaliphatic comonomer, for instance those selected from the group consisting of the following: isophoronediamine, bis(3,5-dialkyl-4-aminocyclohexyl)methane, bis(3,5-dialkyl-4-aminocyclohexyl)ethane, bis(3,5-dialkyl-4-aminocyclohexyl)propane, bis(3,5-dialkyl-4-aminocyclohexyl)butane, bis(3-methyl-4-aminocyclohexyl)methane, p-bis(aminocyclohexyl)methane, and isopropylidenedi(cyclohexylamine), 1,4-dicarboxycyclohexane, 4,4'-diamino-3,3'-dimethyldicyclohexylmethane, 1,4-diaminocyclohexane, hexahydroterephthalic acid, 4-amino-2,2,6,6-tetramethylpiperidine (TAD), piperazine, N-(2-aminoethyl)piperazine, N,N'-bis(2-aminoethyl)piperazine, 1,2-diaminocyclohexane, N,N'-bis(2-aminoethyl)imidazolidone, N-(2-hydroxyethyl)piperazine, isosorbide, isomannide, 1,4-cyclohexanediol, N,N'-bis(2-hydroxyethyl)imidazolidone, 4-amino-1-cyclohexanecarboxylic acid, and trans-1,2-diaminocyclohexane-N,N,N',N'-tetraacetic acid.

The copolyamide may also be a polymer comprising such star macromolecular chains, such as those described in documents FR 2 743 077, FR 2 779 730, U.S. Pat. No. 5,959,069, EP 632 703, EP 682 057 and EP 832 149. These compounds are known to have improved melt flow in comparison with linear polyamides of the same molecular mass.

Copolyamides comprising as minor comonomers a mixture of cycloaliphatic diamine and of aromatic diacid are especially preferred.

As examples of copolyamides according to the invention, mention may be made especially of:
a type 6 copolyamide comprising 4.7 mol % of a mixture of terephthalic acid and of a diamine, especially isophoronediamine;
a type 6 copolyamide comprising 0.37 mol % of a mixture of isophthalic acid and of a diamine, especially isophoronediamine;
a type 6 copolyamide comprising 2 mol % of a mixture of terephthalic acid and hexamethylenediamine;
a type 6 copolyamide comprising 13 mol % of a mixture of isophthalic acid and hexamethylenediamine;
a type 6 copolyamide comprising 5 mol % of a mixture of adipic acid and isophoronediamine; and
a type 6 copolyamide comprising 2 mol % of a mixture of sebacic acid and isophoronediamine The copolyamides may be conventionally manufactured by polymerization, especially in continuous or batch mode.

Most particularly, the composition is in powder form. A powder is an assembly of polyamide particles which is obtained by a variety of possible processes. The powder according to the invention may be obtained in a variety of ways known to a person skilled in the art, depending on the materials used, such as by milling, cryomilling, by polymerization or by precipitation. Mention may be made especially, for example, of documents EP 1 797 141 and WO 2007/115 977 and WO 2010/063 691.

Said powder may especially be manufactured by:
a) melt-blending a (co)polyamide with a compound A consisting of a polymeric material comprising at least one part of its structure that is compatible with said copolyamide and at least one part of its structure that is incompatible with and insoluble in said copolyamide, to give a dispersion of discrete particles of copolyamide;
b) cooling said blend to a temperature below the softening point of the copolyamide; and
c) treating said cooled blend to bring about disintegration of the (co)polyamide particles.

Formation of the blend is especially obtained by melting the (co)polyamide and adding compound A in solid or melt form, and applying a blending energy to obtain formation of the discrete particles of copolyamide dispersed in an advantageously continuous phase formed by compound A. This blend may also be obtained by blending particles of said (co)polyamide and particles of said additive A, in the solid state, and melting the blend of particles, with application of a blending energy to the melt blend, to obtain the formation of discrete particles of (co)polyamides dispersed in an advantageously continuous phase formed by compound A.

The blend may comprise a weight content of (co)polyamide between 50% and 90% and in particular between 70% and 80%.

The weight concentration of additive A in the mixture may be between 10% and 50% and advantageously between 20% and 30%. As a reminder, the end points are included in the ranges presented.

According to one embodiment, said powder consists of (co)polyamide and of additive A, and also optionally:
at least one, in particular one, compound B as defined below, and/or
one or more additives or compounds as defined below.

More generally, the blend may be obtained with any appropriate device such as endless screw mixers or agitator mixers that are compatible with the temperature and pressure conditions used for the use of the copolyamides. According to a preferred embodiment of the invention, the melt blend is formed before the cooling step, for example formed into filaments or rods. This shaping may advantageously be carried out by a process of extrusion through a die. According to a preferred embodiment of the invention, especially when the melt blend is formed, this melt blend is preferably produced in an extruder which feeds the extrusion die.

The melt blend may be cooled via any appropriate means. Among these means, air cooling or immersion in a liquid are preferred.

The step of recovering the (co)polyamide powder advantageously consists of a disintegration treatment of the discrete (co)polyamide particles. This disintegration may be obtained by applying a shear force to the cooled blend. Disintegration of the (co)polyamide particles may also be obtained by immersing the cooled melt blend in a liquid which is a nonsolvent for the thermoplastic polymer and advantageously a solvent for the additive A.

The additive A is advantageously a polymer of block, sequenced, comb, hyperbranched or star type. Thus, the structure that is compatible with the polyamide forms a block, a sequence, the backbone or the teeth of the comb, the core or the branches of the star polymer or of the hyperbranched polymer. According to a preferred embodiment of the invention, the structure that is compatible with the additive A comprises functions that are chemically identical to those of the copolyamide. As additive A, use is preferentially made of compounds chosen from the group comprising: block copolymers of ethylene oxide and of propylene oxide (Pluronic® and Synperonic®) and polyalkylene amines (Jeffamine®).

Besides the (co)polyamide and the additive A, the composition may comprise other compounds.

The additive A may be used in combination with a compound B that is insoluble in and incompatible with the (co)polyamide. Advantageously, this compound B has a chemical structure that is compatible with at least part of the structure of compound A, especially the part of the structure that is incompatible with the (co)polyamide. As examples of compounds B that are suitable for use in the invention, mention may be made of the compounds belonging to the families of polysaccharides, polyoxyalkylene glycols and polyolefins. Compound B may be added separately from compound A or in the form of a mixture with at least part of compound A. It may also be premixed with the thermoplastic polymer.

This process enables particles to be obtained that have a controlled geometry, especially by adjusting the stirring during step a), the nature of the compounds A and/or B, or the temperature and concentration of the various components of the mixture.

The powder according to the invention may especially have one or more of the following characteristics:
- a d50 particle size distribution of between 20 and 100 μm, preferably between 30 and 70 μm, and also fulfilling the following relation: (d90-d10)/d50 of between 0.85-1.3, preferably 0.9-1.2;
- a sphericity factor of between 0.8 and 1, preferably between 0.85 and 1;
- an intraparticulate porosity of less than 0.05 ml/g, preferentially less than 0.02 ml/g, especially for pore sizes of greater than or equal to 0.01 μm.

The particle size distribution d50, the sphericity factor and the intraparticulate porosity are especially defined in patent application WO 2010/063 691.

The compositions used according to the invention, the powders and/or the articles obtained may contain one or more additives or compounds chosen from the group comprising matting agents, heat stabilizers, light stabilizers, pigments, dyes, reinforcing fillers, such as glass fibers or mineral fibers, glass beads, and carbon fibers, nucleating agents, and impact reinforcers such as elastomers, various metals, and anticaking agents such as silica.

The present invention also relates to a process for manufacturing an article fashioned by selective melting of layers, especially by rapid prototyping using a laser, using a powder that may be obtained or is obtained via the process according to the invention. The invention also relates to an article fashioned by selective melting of layers as defined previously.

Manufacture by selective melting of layers is a process for manufacturing articles that comprises laying down layers of materials in powder form, selectively melting a portion or a region of a layer, and laying down a new layer of powder, and again melting a portion of this layer, and so on, so as to give the desired object. The selectivity of the portion of the layer to be melted is obtained by means, for example, of the use of absorbers, inhibitors, or masks, or via the input of focused energy, for instance electromagnetic radiation such as a laser beam.

Sintering by addition of layers, particularly rapid prototyping by sintering using a laser, is most particularly targeted.

Rapid prototyping is a process that makes it possible to obtain pieces of complex shapes without tooling and without machining, from a three-dimensional image of the article to be made, by sintering superposed layers of powders, using a laser. General details regarding rapid prototyping by laser sintering are mentioned in U.S. Pat. No. 6,136,948 and patent applications WO 96/06881 and US 2004/0 138 363.

Machines for carrying out these processes are composed of a construction chamber on a production piston, surrounded on the left and on the right by two pistons which supply the powder, a laser, and means for spreading the powder, such as a roller. The chamber is generally maintained at constant temperature to avoid deformations.

By way of example, the powder is first spread as a uniform layer over the entire chamber, and the laser then plots the 2D section on the surface of the powder, thus sintering it. Screens may also be used. The manufacturing piston descends the thickness of a stratum while one of the powder feed pistons rises. A new layer of powder is spread over the entire surface and the process is repeated until the piece is finished. The piece must then be removed carefully from the machine and cleaned of the unsintered powder surrounding it. Other machines exist in which the powder is not delivered from the bottom by means of pistons, but from the top. This method affords a saving in time since it is then no longer necessary to stop the manufacture of the pieces in order to replenish the machine with powder.

Other processes for manufacture by addition of layers such as those described in patents WO 01/38061 and EP 1 015 214 are also suitable for use. These two processes use infrared heating to melt the powder. The selectivity of the molten parts is obtained in the case of the first process by means of using inhibitors, and in the case of the second process by means of using a mask. Another process is described in patent application DE 103 11 438. In that process, the energy for melting the polymer is provided by a microwave generator and the selectivity is obtained by using a "susceptor". The term "and/or" includes the meanings and, or, and all the other possible combinations of the elements connected to this term.

Other details or advantages of the invention will become more clearly apparent in the light of the examples given below purely by way of indication.

EXPERIMENTAL SECTION

The materials used are as follows:
Homopolyamide K122, sold by DSM, with a relative viscosity of 124 cm$^3$/g according to standards ISO 307, 1157, 1628. This homopolyamide 6 has a heat of cold crystallization according to process P of 98 J/g. The powder obtained has a distribution D50 of 44.8 μm and a particle size dispersion ((D90-D10)/D50) of 1.25.

Type 6 copolyamide comprising 4.7 mol % of a mixture of 50% by weight of terephthalic acid and 50% by weight of isophoronediamine; with a relative viscosity of 130 mg/L in formic acid. This polyamide has a heat of cold crystallization according to process P of 58 J/g. The powder obtained has a distribution D50 of 48.5 μm and a particle size dispersion ((D90−D10)/D50) of 1.2.

These powders were mixed homogeneously with 0.2% by weight of precipitated silica before passing through the rapid prototyping machine. A heat stabilizer is added to the washed rods during the manufacturing process.

Thus, powder A is a mixture of homopolyamide powder K122 with 0.2% by weight of precipitated silica, and powder B is a mixture of type 6 copolyamide powder as described above with 0.2% by weight of precipitated silica.

Sintering Protocol

The powders are sintered on a laser prototyping machine sold by 3D Systems. The particles are placed in two vats adjacent to the working surface and heated to a temperature of 150° C. The particles are brought to the working surface using a roll as a 100-150 micron layer. The working surface is heated to a temperature of between 195 and 210° C. A laser with a power of between 39 and 46 W provides the additional energy required for sintering the particles.

Once the first layer has been sintered, the working surface is lowered and the roll then deposits a second layer of powder onto the working surface, and so on until the final article is obtained.

EXAMPLE 1

Powder A

Homopolyamide powder K122 (5 kg) is placed in a 100 l round-bottomed flask, which is then attached to a rotary evaporator. In order to strip out the residual air, a stream of nitrogen is introduced, and the flask is then raised to a temperature of 200° C. on an oil bath. The temperature is maintained at 200° C. for 30 minutes, and the oil bath is then allowed to return to 30° C. Finally, the powder is recovered.

TABLE 1

|  | Tir (° C.) | Tfr (° C.) | Tfr − Tir (° C.) |
|---|---|---|---|
| Powder A without heat treatment | 155 | 231 | 76 |
| Powder A with heat treatment | 185 | 229 | 44 |

Tir is the initial recrystallization temperature and Tfr is the final recrystallization temperature.

The temperatures Tir and Tfr are measured via the modulated DSC process P.

The decrease in Tfr−Tir is thus 42%. Moreover, sintering tests with treated powder A and with untreated powder A especially show an improvement in the melt flowability with powder A which has undergone the heat treatment.

EXAMPLE 2

Powder B

The heat treatment protocol is identical to that described in Example 1, except that powder B (5 kg) is used.

TABLE 2

|  | Tir (° C.) | Tfr (° C.) | Tfr − Tir (° C.) |
|---|---|---|---|
| Powder B without heat treatment | 155 | 223 | 68 |
| Powder B with heat treatment | 185 | 225 | 40 |

The decrease in Tfr−Tir is thus 41%. In addition, as in Example 1, sintering tests with treated powder B and with untreated powder B also show an improvement in the melt flowability with powder B which has undergone the heat treatment.

Examples 1 and 2 thus clearly show that the heat treatment makes it possible to reduce the difference between Tfr and Tir, but also to improve the behavior of the powders, especially in terms of melt flowability.

The invention claimed is:

1. A process for the heat treatment of a (co)polyamide composition, comprising:
   heating to bring the composition to a temperature below the lowest melting point of the composition, Tfmin, and above the temperature Tfmin−30° C., for at least 10 minutes,
   cooling to room temperature,
   recovering the composition,
   wherein, before treatment and after treatment, the composition exhibits respective initial values of crystal rearrangement temperature, Tir, respective final values of crystal rearrangement temperature, Tfr, and respective values of the difference, Tfr−Tir, between Tfr and Tir, and wherein the value of the difference Tfr−Tir exhibited by the composition after treatment is decreased relative to the value of the difference Tfr−Tir exhibited by the composition before treatment, and
   wherein the composition comprises a total content of PA11 and of PA12 of less than or equal to 10% by weight relative to the total weight of (co)polyamide present in the composition.

2. The process as claimed in claim 1, wherein during the heating step, the composition is brought to a temperature ranging from Tfmin−28° C. to Tfmin−2° C.

3. The process as claimed in claim 1, wherein characterized in that the composition, heated to a maximum temperature equal to the softening point −2° C.

4. The process as claimed in claim 1, wherein the composition comprises (co)polyamide(s) having several melting points with a temperature difference between the highest melting point and the lowest melting point of less than or equal to 15° C.

5. The process as claimed in claim 1, wherein the composition obtained has a Tfr−Tir decreased by at least 15% relative to the value Tfr−Tir of the composition before treatment.

6. The process as claimed in claim 1, wherein the composition comprises a content of (co)polyamide ranging from 50% to 100% by weight, relative to the total weight of the composition.

7. The process as claimed in claim 1, wherein the composition comprises polyamides obtained by polycondensation of at least one linear aliphatic dicarboxylic acid with an aliphatic or cyclic diamine or between at least one aromatic dicarboxylic acid and an aliphatic or aromatic diamine, polyamides obtained by polycondensation of at least one amino acid or lactam with itself, or their blend and (co)polyamides.

8. The process as claimed in claim 1, wherein the composition comprises at least one polyamide chosen from the following polyamides: PA 6.6, PA 6.10, PA 6.12, PA 10.10, PA 12.12, PA 4.6, MXD 6, PA, PA 6, PA 7, PA 9, PA 11, PA 12, PA 13, 6.6/6.T, PA 6.6/6 or a blend thereof and (co)polyamides thereof.

9. The process as claimed in claim 1, wherein the composition comprises a content of (co)polyamide ranging from 50% to 100% by weight relative to the total weight of polyamide.

10. The process as claimed in claim 1, wherein the composition comprises as polyamide only one or more (co)polyamides.

11. The process as claimed in claim 1, wherein the composition comprises a (co)polyamide produced by polymerization of at least one constituent monomer of the polyamide and at least one or more comonomers.

12. The process as claimed in claim 1, wherein the composition comprises a (co)polyamide chosen from (co)polyamides obtained by polycondensation:
　of at least one aliphatic dicarboxylic acid with an aliphatic or cyclic diamine or between at least one aromatic dicarboxylic acid and an aliphatic or aromatic diamine, or a blend thereof and (co)polyarnides thereof,
　of at least one amino acid or lactam with itself, it being possible for the amino acid to be generated by hydrolytic opening of a lactam ring, or a blend thereof and (co)polyamides thereof,
　of diacid, diamine and amino acid,
　mixtures thereof.

13. The process as claimed in claim 1, wherein the composition comprises at least one (co)polyimide produced by polymerization of at least one lactam or amino acid constituent monomer of the polyainide and at least one comonomer represented by formula (1) below:

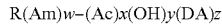
R(Am)$w$–(Ac)$x$(OH)$y$(DA)$z$　　(1)

in which:
　R is a linear; branched, aliphatic, aromatic or cycloaliphatic hydrocabon-based radical
　w is between 0 and 4;
　x is between 0 and 4;
　y is between 0 and 4;
　z is between 0 and 4; and
　w+x+y+z is greater than or equal to 1;
　Am is an amine functional group;
　Ac is a carboxylic acid functional group; and
　DA is a dicarboxylic acid functional group.

14. A (co)polyamide composition made by the process of claim 1, wherein the composition is in powder form.

15. A process for manufacturing an article fashioned by selective melting of layers of a powder according to claim 14.

16. An article made by the process of claim 15.

17. The process of claim 1, wherein the composition is in powder form.

18. The process of claim 2, wherein the composition is brought to a temperature ranging from Tfmin −25° C. to Tfmin −5° C. during the heating step.

19. The process of claim 4, wherein the temperature difference between the highest melting point and the lowest melting point is less than or equal to 10° C.

20. The process of claim 5, wherein the composition after treatment has a Tfr−Tir that is at least 25° C. less than the value Tfr−Tir of the composition before treatment.

21. The process of claim 6, wherein the composition comprises a content of (co)polyamide ranging from 60% to 100% by weight, relative to the total weight of the composition.

22. The process of claim 13, wherein R further comprises heteroatoms.

* * * * *